US008813602B2

(12) United States Patent
Justak et al.

(10) Patent No.: US 8,813,602 B2
(45) Date of Patent: Aug. 26, 2014

(54) ACTIVE BALANCING SYSTEM POWERED BY LIGHT

(71) Applicants: John F. Justak, Stuart, FL (US); Frank M. Caimi, Vero Beach, FL (US); Donna M. Kocak, Vero Beach, FL (US)

(72) Inventors: John F. Justak, Stuart, FL (US); Frank M. Caimi, Vero Beach, FL (US); Donna M. Kocak, Vero Beach, FL (US)

( * ) Notice: Subject to any disclaimer, the term of this patent is extended or adjusted under 35 U.S.C. 154(b) by 0 days.

(21) Appl. No.: 13/939,516

(22) Filed: Jul. 11, 2013

(65) Prior Publication Data

US 2013/0298724 A1    Nov. 14, 2013

Related U.S. Application Data

(62) Division of application No. 12/901,712, filed on Oct. 11, 2010, now Pat. No. 8,505,411, which is a division of application No. 11/350,618, filed on Feb. 9, 2006, now abandoned.

(60) Provisional application No. 60/651,386, filed on Feb. 9, 2005.

(51) Int. Cl.
| *F16F 15/30* | (2006.01) |
| *G01M 1/22* | (2006.01) |
| *F16F 15/18* | (2006.01) |
| *G01M 1/36* | (2006.01) |

(52) U.S. Cl.
CPC ............... *F16F 15/18* (2013.01); *G01M 1/22* (2013.01); *G01M 1/36* (2013.01)
USPC ............................................ 74/574.1; 73/470

(58) Field of Classification Search
USPC ........ 74/572.2, 572.21, 574.1, 574.4; 73/470; 464/180; 700/279; 123/192.1; 416/144
See application file for complete search history.

(56) References Cited

U.S. PATENT DOCUMENTS

| 3,952,602 | A | 4/1976 | Lyman et al. |
| 4,636,578 | A | 1/1987 | Feinberg |
| 5,409,078 | A | 4/1995 | Ishioka et al. |
| 5,688,160 | A | 11/1997 | Pozzetti et al. |
| 5,709,245 | A | 1/1998 | Miller |
| 5,757,662 | A | 5/1998 | Dyer et al. |
| 5,967,269 | A | 10/1999 | Kato |
| 6,342,671 | B1 | 1/2002 | Morikawa et al. |
| 6,606,922 | B2 | 8/2003 | Case et al. |
| 2002/0027390 | A1 * | 3/2002 | Ichiki et al. ................ 307/117 |

FOREIGN PATENT DOCUMENTS

EP    0296593 A1    12/1988

* cited by examiner

*Primary Examiner* — Thomas Diaz
(74) *Attorney, Agent, or Firm* — GrayRobinson, PA

(57) ABSTRACT

An active balancing system for rotating machinery is provided which is light weight, solid state and powered by radiant energy. One or more balance rings coupled to the rotating machinery each have balancing elements which are moved to a selected position by actuators whose operation is controlled according to measured vibration resulting from imbalance of the machinery. The actuators are powered by an electrical energy generating device, such as a photo cell or a photovoltaic element, which is coupled to the machinery and located across an air gap from a source of radiant energy such as an array of light emitting diodes.

12 Claims, 4 Drawing Sheets

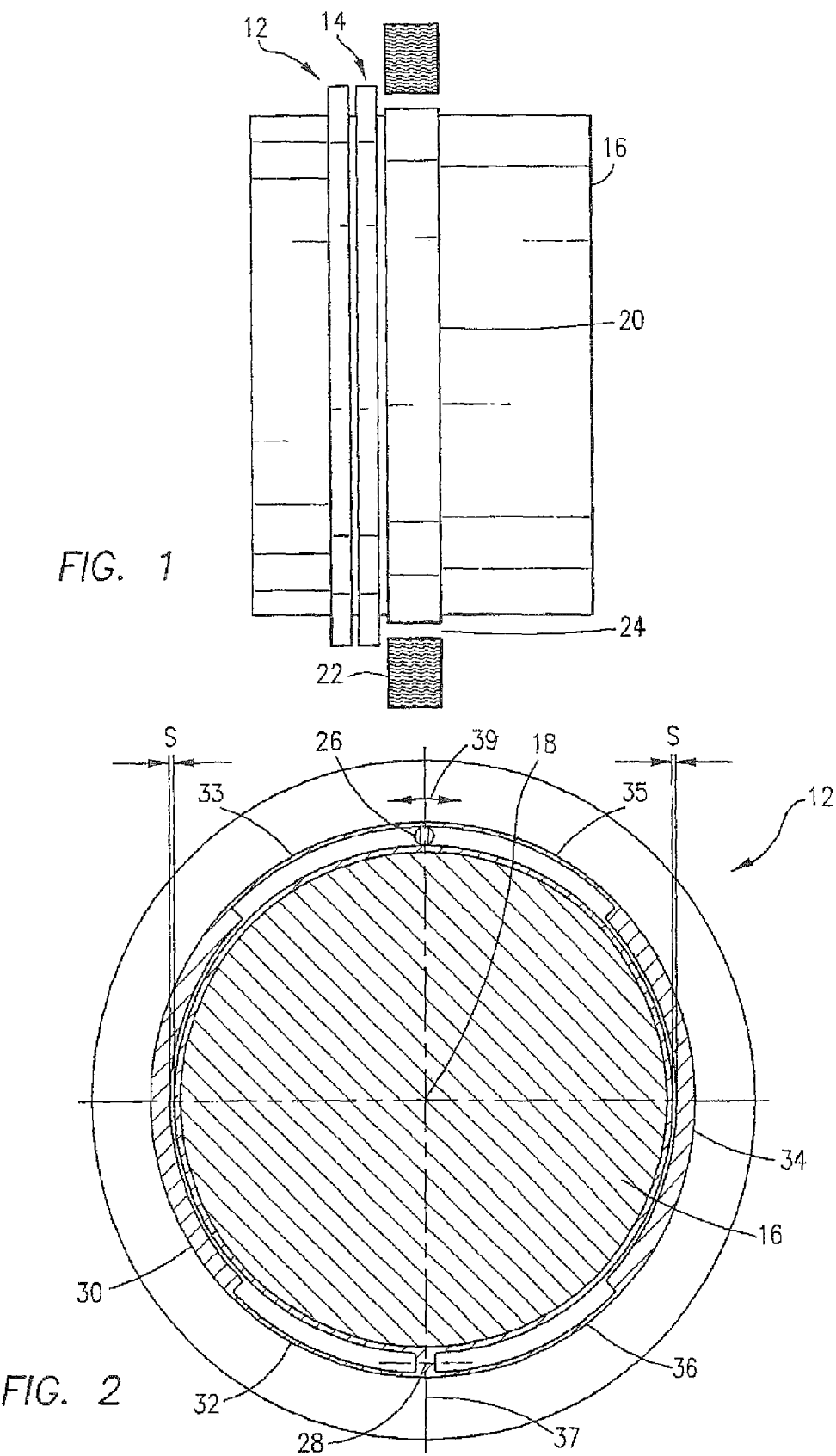

ACTIVE BALANCING SYSTEM POWERED BY LIGHT

RELATED APPLICATION

This application is a divisional of U.S. patent application Ser. No. 12/901,712 filed Oct. 11, 2010, which is a divisional of U.S. patent application Ser. No. 11/350,618 filed Feb. 9, 2006, now abandoned, which claims the benefit of U.S. Provisional Application Ser. No. 60/651,386 filed Feb. 9, 2005 now expired. U.S. Provisional Application Ser. No. 60/651,386 is expressly incorporated herein by reference in its entirety to form part of the present disclosure.

FIELD OF THE INVENTION

This invention relates to systems for balancing machines, and, more particularly, to a light weight, active balancing system for machines which is powered by light.

BACKGROUND OF THE INVENTION

Vibration caused by mass imbalance is a common problem in rotating machinery. Imbalance occurs if the principal axis of inertia of the rotor or other rotating element is not coincident with its geometric axis. The higher the rotational speeds, the greater the centrifugal imbalance forces.

There are generally two types of systems which have been employed to reduce vibration in rotating machinery, namely, passive systems and active systems. Although an active control system is usually more complex than a passive control scheme, it has a number of advantages. First, active vibration control is generally more effective than passive control. Further, passive vibration control is of limited use if several vibration modes are excited. Additionally, because active vibration control devices can be adjusted according to vibration characteristics during operation of the machinery, active vibration techniques are much more flexible than passive vibration control.

Two major categories of active vibration control techniques for rotating machinery have been used in the past. These include direct active vibration control (DAVC) and active balancing. DAVC techniques directly apply a lateral control force to the rotor which is generated by a force actuator such as a magnetic bearing. One advantage of DAVC techniques is that the input control force to the system can be changed quickly. By applying a fast-changing lateral force to the rotating machinery, the total vibration, including synchronous vibration, transient-free vibration and other non-synchronous vibration, can be suppressed. However, DAVC systems are often limited by the maximum force which can be applied by the lateral force actuators employed. At high rotating speeds, the imbalance-induced forces can reach levels beyond the compensation capability of the force actuators in DAVC systems.

Active balancing techniques are typically used in high rotating speed situations where DAVC systems are inadequate. In active balancing schemes, a mass redistribution actuator, e.g. a device whose mass center can be changed, is mounted on the rotor or other rotating element. Initially, the vibration of the rotating system is measured and the imbalance of the rotating machinery estimated, and then the mass center of the actuator is changed to offset the system imbalance. The vibration of the rotating machinery is suppressed by eliminating the root cause of the vibration—system imbalance.

Active balancing systems have an advantage over DAVC systems in that they can provide large compensating forces. However, in systems currently available, operation of the mass redistribution actuator is typically relatively slow. Additionally, while most active systems can eliminate imbalance-induced synchronous vibration, difficulties arise in suppressing transient vibration and other non-synchronous vibration.

SUMMARY OF THE INVENTION

This invention is directed to an active balancing system for rotating machinery which is light weight, solid state and powered by light. One or more balance rings coupled to the rotating machinery each have balancing elements which are moved to a selected position by actuators whose operation is controlled according to measured vibration resulting from imbalance of the machinery. The actuators are powered by an electrical energy generating device, such as a photo cell or a photovoltaic element, which is coupled to the machinery and located across an air gap from a light source, e.g. an array of light emitting diodes (LEDs) or other source of radiant energy.

In one presently preferred embodiment, first and second balance rings are coupled to the rotating machinery. Each of these balance rings includes an actuator mounted approximately 180° from a pivot element, with balancing weights positioned on either side of a plane passing through the actuator and pivot element. The actuator and pivot element of one of the first and second balance rings is offset 90° from those of the other. In response to operation of the actuator of either balance ring, the balancing weights are moved in a clockwise or counterclockwise direction relative to the rotating machinery thus positioning the mass of the balancing weights in a selected location to counteract the imbalance of the machinery.

In an alternative embodiment, a single balance ring is employed having a number of circumferentially spaced balance weights each operatively connected to a discrete actuator. Each actuator is operative to move one of the balance weights radially inwardly and outwardly relative to the rotating machinery to counteract system imbalance.

Both of the preferred embodiments of balance rings described above form a portion of an active balance system which further includes a display, a central processing unit, a communication module, a vibration sensing module, a performance assessment module, and a power module. Generally, vibration of the rotating machinery is sensed and measured by a sensor coupled to the machinery resulting in the production of an RF signal representative of the vibration in the machinery. That signal is transmitted to the central processing unit which is effective to generate an RF control signal transmitted to a controller coupled to the rotating machinery, which, in turn, causes the actuator(s) to move the balancing weights to a selected location. The RF signals are transmitted to and from the rotating machinery by the communication module, which includes microcontroller units and transceivers mounted both on and off of the rotating machinery. Additionally, the power module preferably includes a controller coupled to the central processing unit which is operative to control the intensity of light produced by the light source.

DESCRIPTION OF THE DRAWINGS

The structure, operation and advantages of the presently preferred embodiment of this invention will become further apparent upon consideration of the following description, taken in conjunction with the accompanying drawings, wherein:

FIG. 1 is a side view of one embodiment of the balance rings and electrical energy generating device of this invention;

FIG. 2 is a front view of a balance ring shown in FIG. 1 in a neutral position;

DETAILED DESCRIPTION OF THE INVENTION

Figure 7:
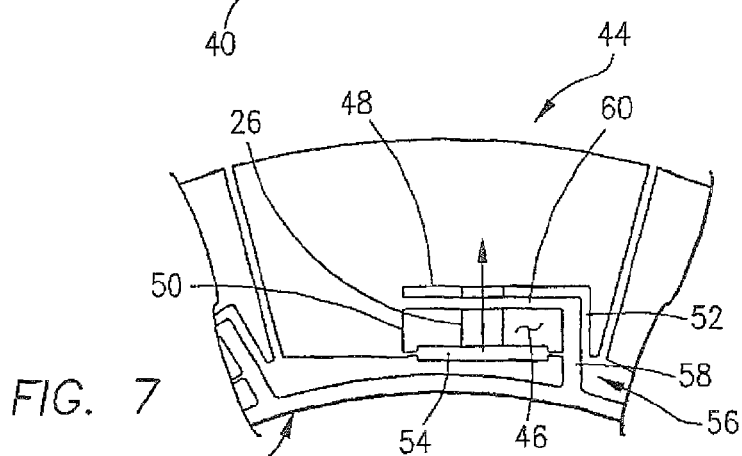
FIG. 7 is a view similar to FIG. 6, except with the balancing weight moved in the opposite direction.
Figure 8:
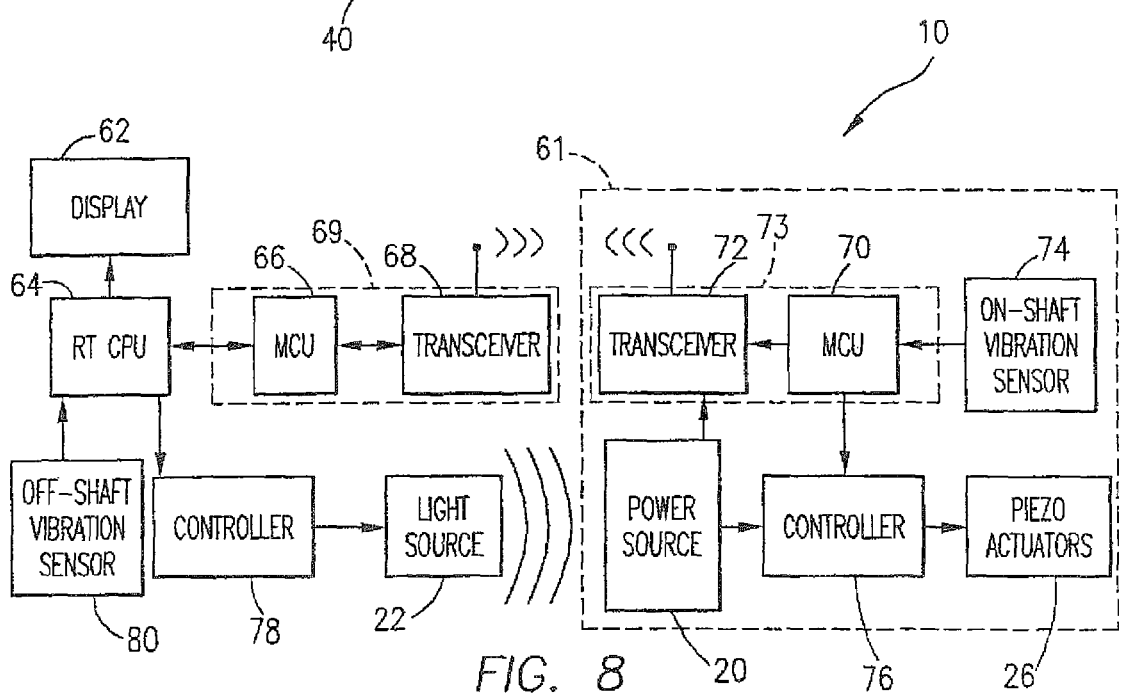
FIG. 8 is a schematic, block diagram of the active balancing system of this invention.

Referring now to the drawings, the active balancing system 10 of this invention is schematically depicted in FIG. 8. Initially, preferred embodiments of balance rings employed in system 10 are discussed with reference to FIGS. 1-7, followed by a description of the overall operation of system 10. For purposes of the present discussion, the terms "machinery" and "rotating machinery" are used interchangeably to broadly refer to essentially any kind of machine having a rotating element, e.g. a rotor, a rotating shaft or other rotating element. In the discussion which follows and in FIG. 8, the term "shaft" is used to identify the machinery or rotating machinery for ease of reference. It should be understood that the description and claimed invention are not limited to the active balancing of a rotating shaft.

Figure 3:
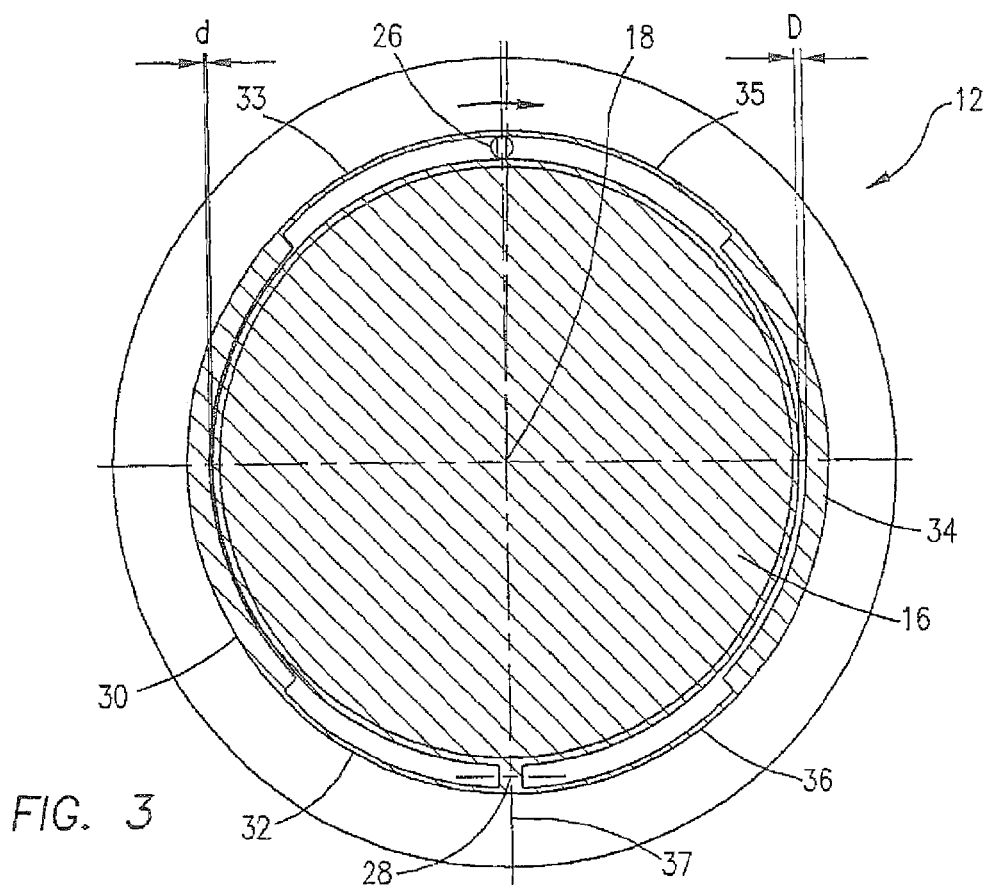
FIG. 3 is a view similar to FIG. 2, except with the balance weights moved in a clockwise direction.
Figure 4:
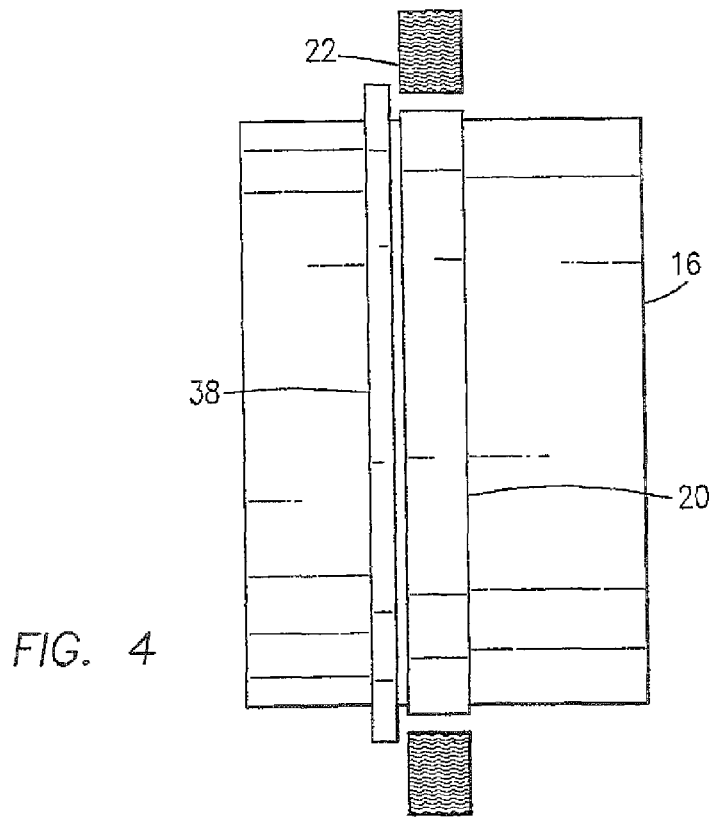
FIG. 4 is a side view of an alternative embodiment of a balance ring according to this invention.

Referring now to FIGS. 1-3, a first balance ring 12 and a second balance ring 14 are coupled to a rotating shaft 16 having a longitudinal axis 18 and a circumference. Each of the balance rings 12 and 14 is preferably 0.25 inches wide and is formed of a material with a density of 0.30 lb/cu-in. The rings 12, 14 are longitudinally spaced from one another and located adjacent to an electrical energy generating device 20 which is also coupled to the shaft 16. The generating device 20 is preferably a photo cell, photovoltaic element or other device capable of converting radiant energy to electrical energy. A light source 22, such as an array of LEDs, or other source of radiant energy, extends around the entire circumference of the generating device 20. The light source 22 is mounted in a fixed position with respect to the rotating generating device 20 to support structure (not shown). An air gap 24 is formed between the light source 22 and generating device 20 across which the radiant energy travels to the generating device 20. As discussed below, the generating device 20 provides electrical energy to the rings 12, 14 and other elements carried by the shaft 16.

As best seen in FIGS. 2 and 3, the balance ring 12 of this invention includes an actuator 26, a pivot element 28, a first balance weight 30, first flexure elements 32 and 33 located at opposite ends of first balance weight 30 and, a second balance weight 34 having second flexure elements 35 and 36 connected at both ends. The actuator 26 and pivot element 28 are located approximately 180° apart, defining a plane 37 passing through both. The first balancing weight 30 and first flexure elements 32, 33 are located on one side of such plane 37, and the second balancing weight 34 and second flexure elements 35, 36 are positioned on the opposite side of the plane 37. The actuator 26 is preferably a piezoelectric actuator which is mechanically preloaded to ensure bi-directional operation and a stroke translation of about 0.005 to 0.01 inches. Coupled with the balance rings 12 and 14 described above, a correction per actuator 26 of 0.5 oz-in. is possible. One suitable piezoelectric actuator is commercially available under Part Number FPA-140 from Dynamic Structures and Materials, LLC of Franklin, Tenn. Although a piezoelectric actuator is employed in the preferred embodiment, it should be understood that other low energy, bi-directional and high stroke translation devices could be used.

Operation of the actuator 26 in one direction of translation causes rotation of the ring 12 about the pivot element 28 in either a clockwise or counterclockwise direction, as represented by the arrow 39 in FIG. 2. In turn, the balancing weights 30 and 34 are moved to a selected location, depending on the extent of translation of the actuator 26, and the flexure elements 32, 33 and 35, 36 undergo corresponding deflection. FIG. 2 depicts the balance ring 12 in a "neutral" position in which the actuator 26 has not been activated and the spacing "S" between each of the balance weights 30 and 34 and the shaft 16 is the same. Translation of the actuator 26 in the clockwise direction, as shown in FIG. 3, places the balancing weights 30 and 34 in a different position relative to the shaft 16 and the flexure elements 32 and 36 deflect accordingly. For purposes of illustration, the balancing weight 30 is shown in FIG. 3 as being shifted to a distance "d" relative to the shaft 16, and the balancing weight 34 is spaced a larger distance "D" from the shaft 16 compared to the balancing weight 30 as a result of the actuator translation. These distances between the balancing weights 30, 34 and shaft 16 are reversed when the actuator 26 is operated in the opposite, or counterclockwise, direction. Further, the magnitude of distances "d" and "D," regardless of whether the actuator 26 operates in the clockwise or counterclockwise direction, is controlled by the extent of translation of the actuator 26, which, in turn, depends on the amount of vibration caused by shaft imbalance. Such movement of the mass of the balancing weights 30 and 34 effectively counteracts imbalance in the rotating shaft 16, thus reducing vibration.

The balance ring 14 is identical to balance ring 12, except it is offset on the shaft 16 approximately 90° from balance ring 12. That is, the actuator 26 of ring 14 is circumferentially spaced about 90° from the actuator 26 of ring 12. In the event a force vector is produced by shaft imbalance which is located between 0° and 90°, the actuator 26 of both of the balance rings 12 and 14 is operated to counteract the resulting vibration, in the same manner described above.

Referring now to FIGS. 4-7, an alternative embodiment of a balance ring 38 is shown. The balance ring 38 replaces the two balance rings 12, 14 described above in connection with a discussion of FIGS. 1-3. It comprises an inner ring 40 coupled to the shaft 16, an outer ring 42 and a number of circumferentially spaced balancing weights 44 located between the inner and outer rings 40, 42. The balancing weights 44 can slide relative to one another, along adjacent side edges, in a radial direction relative to the shaft 16. Each of the balancing weights 44 is formed with a cavity 46 defining an inner wall 48 connected at each end to opposed side walls 50 and 52. A beam 54 is located within each cavity 46 where it is mounted at one end to side wall 50. The inner ring 40 is formed with a number of L-shaped supports 56 each located within one of the cavities 46. Each support 56 includes a first arm 58 oriented generally parallel to the side wall 52 of a cavity 46 connected to a second arm 60 extending generally parallel to and spaced from the inner wall 48. The second arm 60 is connected to or integrally formed with the side wall 50 formed by cavity 46 in balancing weight 44. The opposite end of beam 54 in each cavity 46 mounts to the first arm 58 of a support 56.

Figure 6:
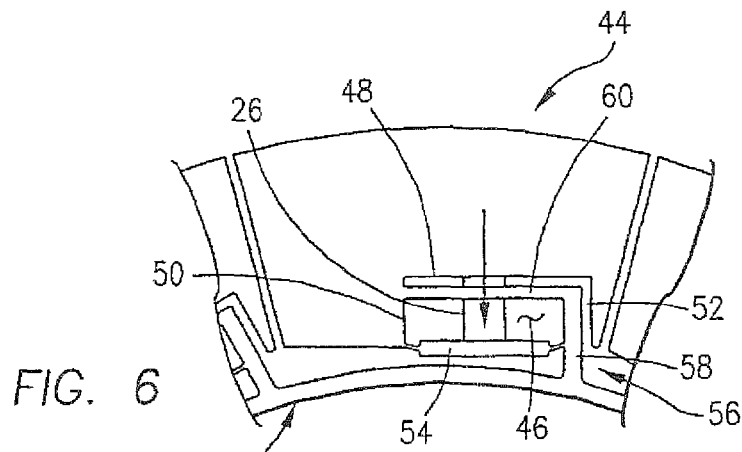
FIG. 6 is an enlarged view of a portion of the balance ring illustrated in FIG. 5 with a balancing weight moved in one direction.

An actuator 26 is provided for each of the balancing weights 54. Each actuator 26 is supported between the outer ring 42 and balancing weights 44 in contact with both the beam 54 and the second arm 60, which are oriented generally parallel to one another as best seen in FIGS. 6 and 7. The actuator 26 may be operated in one of two radial directions, acting against the beam 54 or second arm 60 as shown by the arrows in FIGS. 6 and 7, to move the associated balancing weight 44 radially inwardly or outwardly relative to the shaft 16.

System Operation

Referring now to FIG. 8, the operation of the active balancing system 10 of this invention is described. Generally, the system 10 consists of a number of modules, some located on the shaft 16, some off of the shaft 16 and some both on and off, which collectively sense vibration of the shaft 16 and cause the balance rings 12, 14 or 38 to counteract shaft imbalance. The components contained within the dotted lines designated as box 61 are mounted on the shaft 16, whereas all other components are mounted to support structure or the like off of the shaft 16. The modules include a display module, a processing module, a communication module, a power supply module, a vibration detection module, a performance assessment module and a balance actuator module. Each module is described separately below, followed by a discussion of the overall system 10 operation.

The display module is represented by box 62 in FIG. 8 and preferably consists of a laptop computer of the like having a visual display. The display module 62 is coupled to the processing module, which comprises a real-time central processing unit (CPU) 64. One suitable CPU 64 is commercially available from National Instruments of Austin, Tex. under Model No. PXI-8187 with a Pentium 4, 2.5 GHz controller having a real-time embedded operating system and software.

The CPU 64 is also coupled to the communication module which consists of a microcontroller unit or MCU 66 and a transceiver 68, both located off the shaft 16 as depicted in dotted lines forming box 69, and an MCU 70 and transceiver 72 which are mounted to the shaft 16 by slip rings or the like so as not to rotate with the shaft 16. See box 73. Each transceiver 68 and 72 is preferably Zigbee compliant and capable of both transmitting and receiving RF signals. As shown on the right-hand side of FIG. 8, the MCU 70 is coupled to the vibration detection module, e.g. an on-shaft vibration sensor 74 mounted to the shaft 16. MCU 70 is also coupled to the balance actuator module which consists of a controller 76 and the piezoelectric actuators 26 described above in connection with a discussion of the balance rings 12, 14 and 38.

All of the on-shaft components of the system 10 are provided with electrical energy by the power module, which consists of a second controller 78, the light source 22 and the electrical energy generating device 20 denoted as a "power source" in FIG. 8. The second controller 78 is coupled to the CPU 64.

Finally, the performance assessment module comprises an off-shaft vibration sensor 80 coupled to the CPU 64. The sensor 80 is preferably mounted to the frame of the machinery (not shown) or other structural element in sufficient proximity to the rotating shaft 16 so as to sense the vibrations it produces.

The on-shaft components of the system 10 are powered by operation of the power module. The CPU 64 operates the second controller 78 to illuminate the light source 22 at a predetermined intensity. As described above, the light source 22 directs radiant energy to the generating device 20 which converts it into electrical energy. Piezoelectric actuators 26 act essentially as a capacitor, requiring only micro-watts of energy to actuate and holding charge thus requiring only trickle current.

Figure 5:
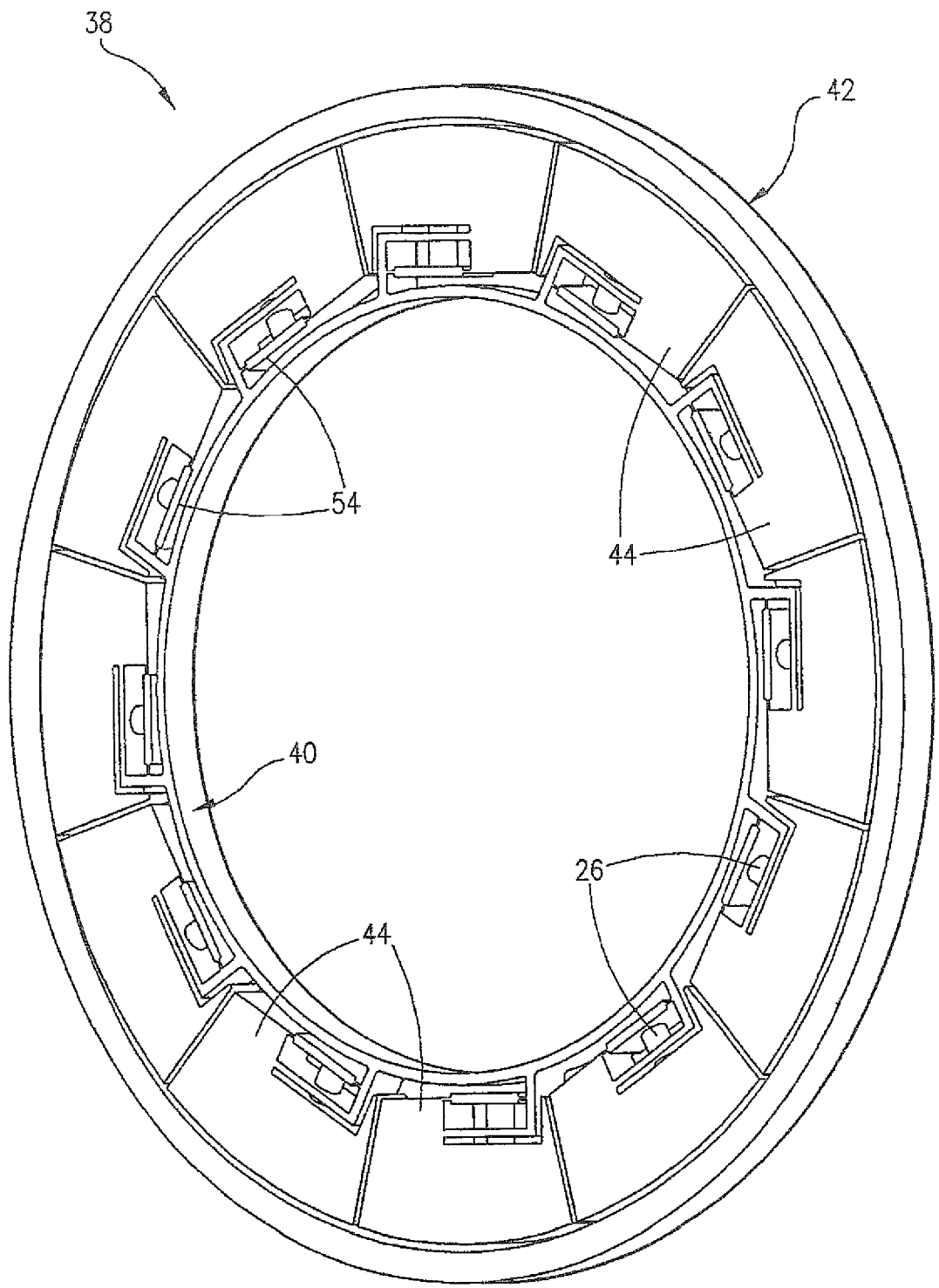
FIG. 5 is an isometric view of the balance ring shown in FIG. 4.

The on-shaft vibration sensor 74 operates to sense the vibration caused by shaft imbalance. MCU 70 and transceiver 72, coupled to the sensor 74, collectively produce an RF signal representative of the sensed vibration which is transmitted to the other components of the communication module, e.g. the MCU 66 and transceiver 68. The CPU 64 receives the signal from MCU 66, and then produces a command signal which is transmitted in the opposite direction through the communication module to the controller 76. The controller 76 governs the operation of the actuators 26. In the embodiment of FIGS. 1-3, it controls whether the actuator 26 of one or both of the balance rings 12 and 14 is operated, and to what extent, i.e. the amount and direction (clockwise or counterclockwise) of translation of one or both actuators 26. The number and extent of translation of the actuators 26 of the balance ring 38 of the embodiment of FIGS. 5-7 is similarly governed by controller 76. Because system 10 is "active" in operation, the on-shaft vibration sensor 74 may be operated continuously and the CPU 64 can make periodic adjustments of the actuators 26 in the manner described above. One or more of the actuators 26 are activated to move the balancing weights 54 inwardly or outwardly, as described above.

The performance assessment module or off-shaft vibration sensor 80 operates to provide a correction, if necessary, to the system operation noted above. Sensor 80 is located in proximity to but not on the shaft 16, e.g. on the support structure for the shaft 16. It produces a signal representative of shaft vibration which is transmitted to the CPU 64 where it is compared with the signal(s) received from the on-shaft vibration sensor 74. In the event of a discrepancy, the CPU 64 is operative to adjust the actuators 26, and, hence, the position of balancing weights 30, 34 or 64, accordingly.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof.

For example, the components of the communication module including MCU 66, 70 and transceivers 68, 72 are described above as transmitting and receiving RF signals. It should be understood that any other form of wireless communication could be employed, such as optical communication or the like.

Therefore, it is intended that the invention not be limited to the particular embodiment disclosed as the best mode contemplated for carrying out this invention, but that the invention will include all embodiments falling within the scope of the appended claims.

What is claimed is:

1. Apparatus for balancing a machine, comprising:
a balance ring coupled to the machine, said balance ring having a number of balancing elements, each of said balancing elements being formed with a cavity defining an inner wall connected at opposite ends to spaced side walls, a beam being located in each of said cavities, each of said beams having a first end and a second end, said first end of each of said beams being connected to one of said side walls;

a number of actuators mounted to said balance ring, each of said actuators being coupled to one of said balancing elements;

an electrical energy generating device coupled to said actuators;

a light source spaced from said electrical energy generating device across an air gap, said light source being positioned to direct radiant energy onto said electrical energy generating device;

each of said actuators being effective to move a respective balancing element to a selected radial location relative to the machine powered by electrical energy from said electrical energy generating device.

2. The apparatus of claim 1 in which said balance ring comprises an inner ring coupled to the machine and an outer ring spaced from said inner ring, said number of balancing elements being located between and circumferentially spaced about said inner and outer rings.

3. The apparatus of claim 2 in which said inner ring is formed with a number of spaced supports each having a first arm connected to a second arm, each of said supports extending within one of said cavities such that said first arm is substantially parallel to one of said side walls of said cavity and such that said second arm is substantially parallel to said inner wall of said cavity and to said beam, said second end of each of said beams being connected to said first arm of one of said supports.

4. The apparatus of claim 3 in which each of said actuators engages said beam and said second arm within said cavity of one of said balancing elements, each of said actuators being operated in a first radial direction acting on one of said beams and in a second radial direction acting on one of said second arms.

5. The apparatus of claim 1 in which said electrical energy generating device is a photo cell.

6. The apparatus of claim 1 in which said electrical energy generating device is a photovoltaic element.

7. Apparatus for balancing a machine, comprising:

a balance ring including an inner ring coupled to the machine and an outer ring spaced from said inner ring, said balance ring having a number of balancing elements located between and circumferentially spaced about said inner and outer rings, each of said balancing elements being formed with a cavity defining an inner wall connected at opposite ends to spaced side walls, a beam being located in each of said cavities, each of said beams having a first end and a second end, said first end of each of said beams being connected to one of said side walls;

a number of actuators mounted to said balance ring, each of said actuators being coupled to one of said balancing elements;

an electrical energy generating device coupled to said actuators;

a light source spaced from said electrical energy generating device across an air gap, said light source being positioned to direct radiant energy onto said electrical energy generating device;

each of said actuators being effective to move a respective balancing element to a selected radial location relative to the machine powered by electrical energy from said electrical energy generating device.

8. The apparatus of claim 7 in which said inner ring is formed with a number of spaced supports each having a first arm connected to a second arm, each of said supports extending within one of said cavities such that said first arm is substantially parallel to one of said side walls of said cavity and such that said second arm is substantially parallel to said inner wall of said cavity and to said beam, said second end of said beam being connected to said first arm of said support.

9. The apparatus of claim 8 in which each of said actuators engages said beam and said second arm within said cavity of one of said balancing elements, each of said actuators being operated in a first radial direction acting on one of said beams and in a second radial direction acting on one of said second arms.

10. Apparatus for balancing a machine, comprising:

a balance ring coupled to the machine, said balance ring having a number of balancing elements, each of said balancing elements being formed with a cavity defining at least one wall, a beam being located in each of said cavities, each of said beams having a first end and a second end, said first end of each of said beams being connected to said at least one wall within said cavity;

a number of actuators mounted to said balance ring, each of said actuators being coupled to one of said balancing elements;

an electrical energy generating device coupled to said actuators;

a light source spaced from said electrical energy generating device across an air gap, said light source being positioned to direct radiant energy onto said electrical energy generating device;

each of said actuators being effective to move a respective balancing element to a selected radial location relative to the machine powered by electrical energy from said electrical energy generating device.

11. The apparatus of claim 10 in which said balance ring comprises an inner ring coupled to the machine and an outer ring spaced from said inner ring, said inner ring being formed with a number of spaced supports each having a first arm connected to a second arm, each of said supports extending within one of said cavities, said second end of each of said beams being connected to said first arm of one of said supports.

12. The apparatus of claim 11 in which each of said actuators engages said beam and said second arm within said cavity of one of said balancing elements, each of said actuators being operated in a first radial direction acting on one of said beams and in a second radial direction acting on one of said second arms.

* * * * *